(12) United States Patent
Armga et al.

(10) Patent No.: US 6,390,371 B1
(45) Date of Patent: May 21, 2002

(54) METHOD AND SYSTEM FOR DISPLAYING INFORMATION UNIFORMLY ON TETHERED AND REMOTE INPUT DEVICES

(75) Inventors: Dave Armga, Nampa; Gary Gaige, Meridian; Brad Wykert, Caldwell, all of ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/023,389

(22) Filed: Feb. 13, 1998

(51) Int. Cl.[7] .................................................. G06K 7/00
(52) U.S. Cl. ................................. 235/472.01; 345/2.2
(58) Field of Search ............................... 345/764, 716, 345/866, 970, 1.1, 1.2, 2.1, 2.2, 156; 235/462.45, 462.15, 462.25, 472.01

(56) References Cited

U.S. PATENT DOCUMENTS

| | | | | |
|---|---|---|---|---|
| 5,059,778 A | * | 10/1991 | Zouzoulas et al. | 235/472.02 |
| 5,218,187 A | * | 6/1993 | Koenick et al. | 235/375 |
| 5,322,991 A | * | 6/1994 | Hanson | 235/462.46 |

OTHER PUBLICATIONS

"WaveLink OLE Server Technical Manual" (complete citation not available), published on or before Feb. 1, 1997, Table of Contents, pp. 19–168.

* cited by examiner

Primary Examiner—Chanh Nguyen
Assistant Examiner—Fritz Alphonse
(74) Attorney, Agent, or Firm—Dorsey & Whitney LLP

(57) ABSTRACT

A system for displaying information with a uniform visual display appearance on a variety of computer display devices, regardless of varying display capabilities of the display devices and of whether the display devices are tethered to the computer system or are remote. The system acts as an intermediary between an application program and the display devices. The system first receives information from the application program that is to be displayed on one of the display devices. The system then determines the location and display capabilities of the display device, and generates appropriate instructions that will display the received information on the display device. These instructions are generated in such a manner as to compensate for the varying display capabilities of the display devices, thus allowing the information to appear with a uniform visual display appearance on any of the devices to which the information may be displayed. If the display device is tethered to the computer system via a physical connection, the system directly invokes the display interface to the display device. If the display device is instead a remote device that is not local and tethered, the system generates instructions to invoke the display interface to the remote device and transmits the instruction to the remote device using a communication interface. If the application program is responding to information received from a peripheral device, the system can select an appropriate display device on which to display the response information.

39 Claims, 6 Drawing Sheets

METHOD AND SYSTEM FOR DISPLAYING INFORMATION UNIFORMLY ON TETHERED AND REMOTE INPUT DEVICES

TECHNICAL FIELD

The present invention relates generally to displaying information on a computer system, and more particularly to displaying information uniformly on various computer data input devices.

BACKGROUND OF THE INVENTION

In the past, personal computer systems were generally stand-alone systems in which the computer displayed information to a single user on a single display device (e.g., a computer monitor). However, as computers have become increasingly sophisticated, they frequently have a variety of auxiliary display devices, in addition to the primary display device, to which they can display information. For example, peripheral devices such as input/output (I/O) devices often have integrated displays that are used to display information about the peripheral device. If these peripheral devices can also display information that they receive from the computer system, then they can act as auxiliary display devices for the system. Examples of peripheral devices that often have such integrated displays include output devices such as printers and input devices such as scanners. The integrated displays of such devices can vary widely in their size and display capabilities, such as the number of display lines, the number of colors, the types and sizes of fonts, and the ability to display non-textual information such as images, animation, or full-motion video. In addition to these primary and auxiliary display devices that are part of the computer system (i.e., local display devices), computers increasingly can also display information on display devices that are part of other computer systems (i.e., non-local display devices) via a shared network between the systems. These non-local display devices can also vary in size and display capability.

Each display device typically has a display interface that allows a program executing on a computer system to invoke the display capabilities of the device. These display interfaces (e.g., a set of window display functions to display information in a window of a graphical user interface) can differ for different types of display devices, and even for different devices of the same type. For example, since operating systems normally provide a display interface to the primary display device, different operating systems typically provide different display interfaces. Thus, the display interface to a primary display device on a computer system running the WINDOWS operating system will be significantly different than the display interface to that same display device on a computer system running the MACOS operating system. In addition to the differences in display interfaces caused by operating systems, peripheral devices with integrated displays typically have proprietary display interfaces that are different from the display interface to the primary display device.

Many local display devices are tethered to the computer system via a physical connection such as a copper wire or a fiber-optic cable. However, in addition to local tethered display devices, a computer system may need to display information on display devices that are local but untethered (e.g., a wireless I/O device) or to display devices that are non-local (e.g., a primary display of another computer system). Devices that are non-local and devices that are local but untethered are referred to as remote devices since they often can be located some distance from the computer system. As described above, an application program typically invokes a function of the appropriate display interface to display information on a tethered local display device. However, to display information on a remote device, it is necessary to use a communication interface (e.g., a network message protocol) in addition to a display interface. Communication interfaces allow a program executing on a computer system to communicate information to a remote device over a variety of transmittal mediums such as copper wire, fiber-optic cable, or various wireless mediums. Therefore, to display information on a remote display device (e.g., a local wireless auxiliary display device or a non-local primary display device of another computer system), an application program will typically have to generate information that can invoke the display interface to the remote device, and will then have to invoke a function in a communication interface to transmit the information to the device. When the information is received by the remote device, the information can then be used to invoke the display interface. Typically, the information transmitted will be an instruction that invokes a function of the display interface.

Due to differences in display interfaces and display capabilities, separate application programs are typically developed when information must be displayed using different display interfaces. For example, a product like Microsoft Word will typically have one application program for a computer system running the WINDOWS operating system, and a separate application program for a computer system running the MACOS operating system. Even if the same information is to be displayed, different application programs are often created. For similar reasons, it is also typically the case that separate application programs are developed for different types of communication schemes (e.g., local tethered display versus local untethered display). Even if a single application program is developed that can display information on either a local tethered or a remote display device, the application program will have to contain separate code to invoke the display interface to the tethered device, to invoke the communication interface to the remote device, and to invoke the display interface to the remote device.

Having multiple separate application programs creates a variety of problems. For example, the developers for each application program will have to determine the display interfaces and communication interfaces that the application program will use, and will then spend a large amount of effort to create the appropriate program code to display information using these interfaces. This effort will largely be duplicated for each of the application programs that are created. In addition to duplication of effort related to displaying information, application programs which display the same information on different display devices will also duplicate much of the code used to generate the information that will be displayed. Moreover, if separate application programs with similar functionality are modified over time, effort will have to be expended to modify each of the programs as well as to maintain consistency between the programs.

In addition to these problems of duplication of effort, it is often desirable that regardless of the display device on which information is to be displayed, that the information have a uniform visual display appearance (i.e., to appear substantially identical to users). For example, documentation will often have to be prepared for each different application program visual display appearance, and users will have to be trained on the use of each of these different visual display appearances. However, it is difficult to create a uniform visual display appearance on different display devices. Even if a single application program is displaying the same information on two display devices of the same type, the generated visual display appearances are likely to be different if different display interfaces are used. These differences in the visual display appearances can arise due to different functionality provided through the different display interfaces, or from the same type of functionality provided in a different manner (e.g., one display interface may use pop-up menus to display information to be selected by the user, while another display interface may use a pull-down menu or toolbar buttons). The problem of differences in visual display appearances is only exacerbated when there are separate application programs to display the same information, and when different display devices have different display capabilities. Even if an explicit effort is made to display the same information with a uniform visual display appearance, it is likely to be difficult and time-consuming to maintain this uniformity.

Other difficulties can arise when developing an application program that will display information on a display device other than the primary display device. For example, it may be difficult to debug problems with the application program due to the display interface or the communication interface being used (e.g., if an error occurs after interface functionality is invoked, only limited information may be returned from the interface about the error). Alternatively, if the display device for the program is a peripheral device with an integrated display, it may be difficult to obtain such a device for testing. Thus, various problems exist with displaying information on a variety of display devices, particularly when a uniform visual display appearance is desired.

SUMMARY OF THE INVENTION

Some embodiments of the present invention provide a method and system to display information with a uniform visual display appearance on a variety of computer display devices, regardless of varying display capabilities of the display devices and regardless of whether the display devices are tethered to the computer system or are remote from the computer system. The system acts as an intermediary between an application program and the display devices. The system first receives information from the application program that is to be displayed on one of the display devices. The system then determines the location and display capabilities of the display device, and generates appropriate instructions that will display the received information on the display device. These instructions are generated in such a manner as to compensate for the varying display capabilities of the display devices, thus allowing the information to appear with a uniform visual display appearance on any of the devices. If the display device is tethered to the computer system via a physical connection, the system directly invokes the display interface to the display device. If the display device is not local and tethered to the computer system (i.e., it is remote), the system instead generates instructions to directly invoke the display interface to the remote device and transmits the instructions to the remote device using a communication interface. If the application program is responding to information received from a peripheral device, the system can select an appropriate display device on which to display the response information.

In one embodiment, the system maintains a uniform visual display appearance for an application program on various display devices so as to minimize user training costs associated with different visual display appearances. In another embodiment, the system minimizes the effort required to develop application programs that can display information to various display devices and to maintain different programs that display the same information to different display devices. In yet another embodiment, the system tests a computer program that is designed to display information on one display device by displaying the information on another display device that emulates the display of the first display device.

DETAILED DESCRIPTION OF THE INVENTION

Figure 1:
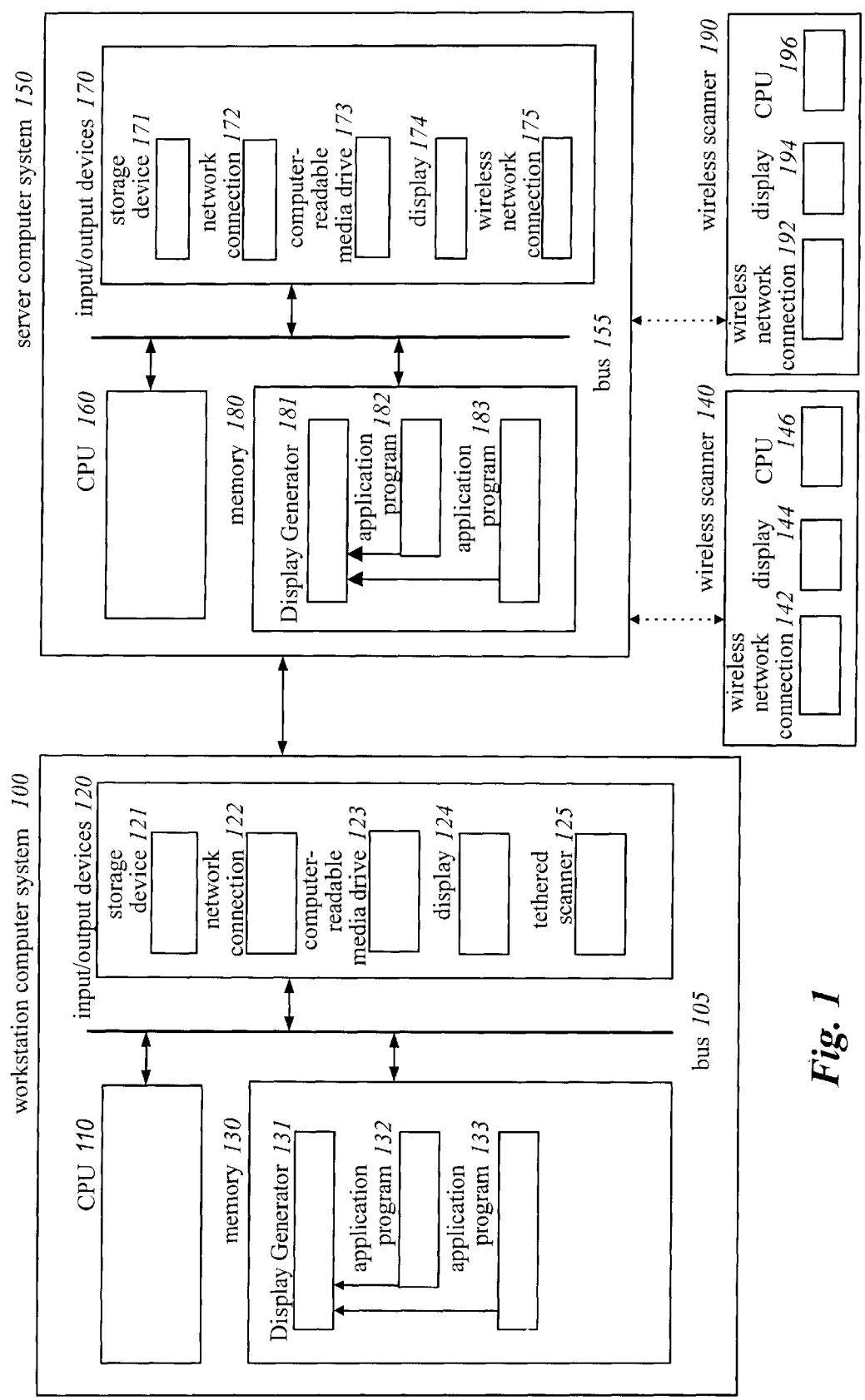
FIG. 1 is a block diagram illustrating an embodiment of a Display Generator system of the present invention.

An embodiment of the present invention provides a method and system for a computer system to generate display information with a uniform visual display appearance on a variety of display devices, regardless of whether the display devices are tethered to the computer system or are remote from the computer system and regardless of varying display capabilities of the display devices. In particular, a Display Generator (DG) system acts as an intermediary between an application program on the computer system and the display devices. When the application program wants to display information on one of the display devices, the application program sends the information to the DG system. The DG system then determines the location and display capabilities of a display device, and generates appropriate instructions that will display the received information on the display device. These instructions are generated in such a manner as to compensate for the varying display capabilities of the display devices, thus allowing the information to appear with a uniform visual display appearance on any of the devices.

As discussed earlier, displays can vary widely in their size and display capabilities, such as the number of display lines, the number of colors, is the types and sizes of fonts, and the ability to display non-textual information such as images, animation, or full-motion video. To display textual information, for example, it is necessary to choose a screen location at which to display the information, as well as a font type, size, and color with which to display the text. To determine a uniform visual display appearance, the DG system selects display capabilities common to all display devices on which the information may be displayed. In one embodiment, the DG system determines the display capabilities for all of the display devices to which the application program may display information, and selects only shared display capabilities (e.g., font type and screen location). In an alternate embodiment, the DG system knows the display capabilities for a display with a minimum set of capabilities. If one of the possible display devices has only a small circular black-and-white screen and has only a single font type and size, for example, then the selected capabilities for displaying text could only include a black or white font of that type and size, and the text could only be displayed in an area the size of the circular screen.

After generating instructions consistent with the uniform visual display appearance, the DG system causes the instructions to be executed so as to display the information. If the display device is tethered to the computer system via a physical connection (e.g., the primary display device for the computer system), the DG system directly invokes the display interface to the display device. If the display device is not a local tethered device (i.e., it is a remote device), the DG system instead generates instructions to invoke the display interface to the remote device and transmits the instructions to the remote device using a communication interface. If the application program is responding to information received from a peripheral device (e.g., an input device tethered to the computer system), the DG system can select an appropriate display device (e.g., the primary display device) on which to display the response information.

By providing a facility for displaying information with a uniform visual display appearance on a variety of different display devices with different sizes and display capabilities, the DG system provides a variety of benefits. In particular, the DG system eliminates the need for the developers of each application program to determine relevant display interfaces and communication interfaces, and to then generate the appropriate code to invoke those interfaces. In addition, since the application program need only generate the information to be displayed, the DG system eliminates the need to develop separate application programs for displaying the same information using different display interfaces and communication interfaces. Since the DG system generates a uniform visual display appearance regardless of the display device, it is easier to train users who will interact with a single visual display appearance. Moreover, the uniform visual display appearance capabilities of the DG system allows an application program that will display information at run-time on one display device to test the visual display appearance of the application program using a different display device. This can be beneficial if the run-time display device is not available, or if it is difficult to test the application program using that display device. The DG system thus solves many of the problems that exist in the prior art.

FIG. 1 illustrates a workstation computer system 100 and a server computer system 150, each suitable for executing a DG system. Workstation computer system 100 includes a CPU 110, input/output devices 120, a bus 105, and a memory 130. The input/output devices include a storage device 121, a network connection 122, a computer-readable media drive 123, a display device 124, and a tethered scanner 125. The memory 130 includes application programs 132 and 133, and a Display Generator (DG) system 131. As the workstation computer system 100 operates, information will enter the system via input devices such as the tethered scanner. One or both of the application programs may receive this information as input, and may wish to display information to an operator of the scanner in response to the input. Rather than determining specific display parameters for the information to be displayed (e.g., location, size, and color of the displayed information) and generating an appropriate instruction to be executed by the CPU, the application programs can instead merely transmit the information to be displayed to the DG system.

When the DG system receives information from an application program, it first determines an appropriate display device on which to display the information. In one embodiment, the application program can specify a display device to be used. Alternatively, the DG system can choose an appropriate display device. This choice can be made in a variety of ways. For example, if an application program responds to information received from the tethered scanner, the response information can be displayed on the primary display device 124, regardless of whether the tethered scanner can act as an auxiliary display device (i.e., has a display and can receive information from the computer system to be displayed). Alternatively, the default display device can be the tethered scanner if the scanner can act as an auxiliary display device. If it is determined that the user of the computer system is remote from the computer system, then the DG system can attempt to display the information on a remote display device. For example, the user of an application program executing on the workstation computer system may physically be at another computer system on a shared network (e.g., the server computer system). If so, the DG system can display the information on the primary display device for that other computer system. In an alternate embodiment, the user may be using a remote peripheral device that is local but untethered from the system (e.g., a wireless pager). If the remote peripheral device can act as an auxiliary display device, then the DG system can display the information on the remote auxiliary display device. The DG system can determine the location of the user in a variety of ways, such as by monitoring information received from the input devices or by receiving user location information from the application program.

If the information is displayed on a primary display device, the information will typically be communicated to the user through a Graphical User Interface (GUI). Each application program typically has one or more visible windows in the GUI in which application program information can be displayed. GUIs on primary display devices can typically display a wide variety of types of information to a user (e.g., text and images), and can display a particular piece of information in a variety of ways (e.g., different font types, sizes and colors). Conversely, peripheral computer devices with integrated displays typically have significantly less display capabilities than a primary display device. For example, if the tethered scanner has an integrated display, the size of the display is likely to be significantly smaller than that of the primary display device. In addition, while such an integrated display may have its own limited GUI, it is unlikely that the integrated display will support such features as multiple overlapping windows, a wide variety of font types and sizes, a large number of colors, or the ability to produce special graphics effects such as animation or full-motion video.

After determining the display device on which the information will be displayed, the DG system selects a uniform visual display appearance that will be generated for the information regardless of the display device. For example, in order to display textual information, it is necessary to choose a location to display the information, as well as a font type and size with which to create the display. To ensure a uniform visual display appearance for an application program, the DG system first needs to know the display capabilities for all of the display devices to which the application program may display information. After determining these various display capabilities, the DG system can select display capabilities for the uniform visual display appearance that are supported by all of the possible display devices. For example, for each of the application programs 132 and 133, the DG system 131 can identify all of the display devices to which the application program can display information. This information can be supplied by the application programs themselves, or the DG system 131 can identify the display devices that are part of the workstation computer system as well as the display devices on other computer systems with which the application program is communicating. After identifying the possible display devices, the DG system then determines the size of the smallest such display device. The DG system also determines the minimum display capabilities of the possible display devices for the information to be displayed. For example, some display devices support proportional and non-proportional fonts of various sizes, while other display devices may support only a single type of font in a single font size. In addition, different display devices may use different methods for specifying locations on the display device. GUIs with multiple windows often maintain an XY coordinate system for each window, and combine this information with the location of the window on the display device to determine the appropriate pixels with which to display information. Other display systems may specify pixels directly, with each pixel having a unique identifier such as a number. The DG system can determine display characteristics in a variety of ways, such as by receiving information from the application programs, by examining the functionality provided by display interfaces to the display devices, or by maintaining a database of display capabilities for a variety of display devices.

After determining the display capabilities (e.g., the location and type of font) which will be used for the uniform visual display appearance, the DG system then generates the appropriate instructions to display the information. The generated instructions will typically invoke one or more functions in a display interface. In a window-based GUI (e.g., the Microsoft WINDOWS operating system's GUI), for example, the window system will typically provide a set of instructions for displaying information in a window. Display devices that do not have a window system will typically provide a specialized set of display functions. If the information is to be displayed on the primary display device, the DG system first opens a window with the determined minimum size on the primary display device. If both application programs 132 and 133 wish to display information related to the tethered scanner on the primary display device, separate windows could be opened for each application program or a single window could be used to display information from both application programs. If the DG system will instead be displaying information on an auxiliary display device of the workstation computer system that does not have a window system (e.g., an integrated display on the tethered scanner), the DG system will invoke functions so that the portion of the display corresponding to the determined minimum size will be used. After generating the appropriate display interface functions, the DG system executes the instructions on the CPU to display the information on the display device.

If the information is to be displayed on a remote display device, the instructions generated by the DG system will need to be transmitted to the remote device. For example, in a networked environment an application program on one computer system may wish to display information on a display device of a different computer system on the network. If workstation computer system 100 and server computer system 150 can communicate via a network, then one of the application programs on workstation computer system 100 may wish to display information on the display 174 of server computer system 150. If so, the application program could specify the desired destination with a network identifier for the server computer system (e.g., a TCP/IP network address). Rather than directly invoking the display interface to the display 174 (e.g., a GUI window system on the display 174), the DG system will instead generate instructions to invoke the display interface in a manner similar to that for a tethered primary display device, and will then transmit the instructions to server computer system 150 over the network. These transmitted instructions can then be executed on the server computer system's CPU 160 to invoke the display interface and display the desired information. Networking protocols that allow information to be transmitted over a network are well known in the art (e.g., the Ethernet protocol), and can allow a display instruction to be transmitted via a physical medium. In this manner, an application program on workstation computer system 100 could display information on both display 124 and display 174 in such a manner that the visual displays appearances are identical, even if the display devices were of different types and sizes.

While tethered I/O devices often do not have integrated displays, it is common for remote I/O devices to have such displays, particularly when the remote devices are portable. Originally, such portable devices were designed to function for a period of time as stand-alone units away from a computer system, and to occasionally be tethered to a computer system so that information could be shared between the device and the computer system. Increasingly, however, portable devices may be in constant communication with a computer system via a wireless connection. This allows a wireless input device to constantly transmit information to the computer system, thus providing continuous input to an application program on the computer system. However, while the computer system can quickly receive information from a wireless input device, the user of the wireless input device will often be sufficiently far from the computer system that the user cannot receive feedback via the primary display device (e.g., if data is incorrectly entered into the input device, the operator would not know to re-enter the data). Thus, an integrated display on a wireless portable input device can be used to display the information being transmitted to the computer system. In addition, the integrated display may be able to display additional information that is transmitted from the computer system. For example, the computer system could request additional information if the user entered certain types of information.

Wireless scanners 140 and 190 are wireless input devices that are in communication with server computer system 150 via a wireless network. Wireless scanner 140 is a remote portable device that includes a wireless network connection 142, a display 144, and a CPU 146. Wireless scanner 190 is a remote non-portable device that similarly includes a wireless network connection 192, a display 194, and a CPU 196. Since the wireless scanners include integrated displays and can receive information to be displayed, they can act as auxiliary output display devices for the server computer system. The server computer system uses its wireless network connection 175 to exchange information with the wireless network connections 142 and 192 of the wireless scanners. Server computer system 150 also includes input/output devices 170, a memory 180, and a bus 155. In addition to the wireless network connection and the display 174, the input/output devices 170 include a storage device 171, a network connection 172, and a computer-readable media drive 173. The memory 180 includes application programs 182 and 183, and the Display Generator (DG)

system 181. Application program 182 is in communication with wireless scanner 140, and application program 183 is in communication with wireless scanner 190.

If one of the application programs wants to send information to their wireless scanner for display, the application program merely forwards the information to the DG system 181. The DG system then identifies the particular wireless scanner on which the information will be displayed (e.g., by maintaining a mapping between application programs and wireless scanners or receiving destination information from the application program). The DG system 181 performs similarly to DG system 131 in generating an appropriate instruction that will invoke the display interface to the wireless scanner so as to display the received information with a uniform visual display appearance regardless of the display device. After DG system 181 has generated the appropriate instruction, it will transmit the instruction to the wireless scanner via the wireless network connection, typically by invoking an appropriate wireless communication interface. The wireless scanner will receive the instruction, and the CPU on the wireless scanner will then execute the transmitted instruction and thereby display information on the integrated display of the scanner. In an alternative embodiment, it is possible for the DG system to instead generate an instruction to be executed on the local CPU 160 in such a manner that the execution will generate information to be displayed, and the generated information will be transmitted via the wireless network connection and displayed directly on the display of the wireless scanner.

Those skilled in the art will appreciate that computer systems 100 and 150 and wireless scanners 140 and 190 are merely illustrative. Thus, the computer systems and wireless scanners may contain additional components or may lack some illustrated components. The computer systems may also be connected to other devices such as computer systems or storage devices, and the wireless scanners may be connected to each other and to other computer systems via a wireless network. In addition, other types of peripheral devices and various types of scanners can be used. Accordingly, the present invention may be practiced with other computer system configurations.

Figure 2:
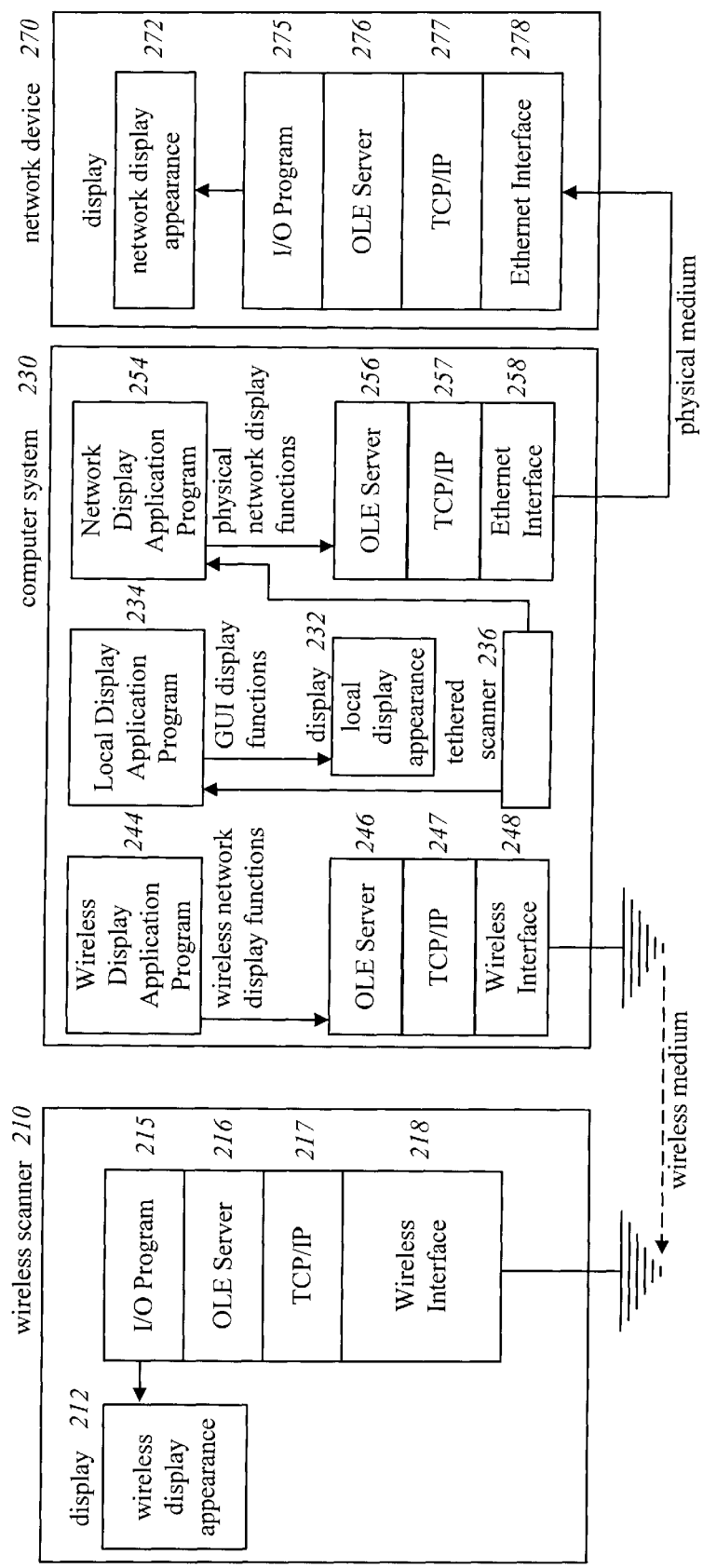
FIG. 2 is a block diagram illustrating a system for displaying information on a variety of display devices by using several different application programs.

FIG. 2 provides an example of a system for displaying information on a variety of display devices, with the system using separate application programs for each separate display device. FIG. 2 includes a wireless scanner 210, a computer system 230, and a network device 270. The wireless scanner includes an integrated display 212 and a wireless communication mechanism consisting of a stack with several layers. The layers of the stack, from bottom to top, include a wireless interface layer 218, a TCP/IP layer 217, an OLE Server layer 216, and an I/O Program layer 215. Each of the layers can communicate with neighboring layers, the I/O Program layer can send display information to the display 212, and the wireless interface layer can communicate with other devices via wireless transmissions. Similarly, the network device includes a display 272 and a network communication mechanism consisting of a stack with several layers. The layers of the stack, from bottom to top, include an Ethernet interface layer 278, a TCP/IP layer 277, an OLE Server layer 276, and an I/O Program layer 275. Each of the network communication mechanism layers can communicate with neighboring layers, the Ethernet interface layer can communicate with other devices via a network using the Ethernet protocol on a physical medium (e.g., copper wire or fiber-optic cable), and the I/O Program layer can send display information to the display 272.

If it is desirable to have an application program on the computer system which could display information on the wireless scanner, a wireless display application program would typically be developed for that purpose. That wireless display program would receive input information from the wireless scanner via a wireless communication mechanism on the computer system, and would transmit display information to the wireless scanner via the same mechanism. For example, computer system 230 includes a wireless display application program 244, as well as a wireless communication mechanism comprising a wireless interface layer 248, a TCP/IP layer 247, and an OLE Server layer 246. To display information on the wireless scanner, the wireless display application program must have knowledge of both the display capabilities of the wireless scanner (e.g., the functions available in the I/O Program layer 215), and the necessary functions to transmit information via the wireless connection (e.g., the functions available in the OLE Server layer 246). Thus, the wireless display application program generates information to be displayed, determines the appropriate display function on the wireless scanner, and then transmits the display interface instruction via a wireless network communication mechanism. The information is transmitted by specifying the destination of the wireless scanner, and then invoking functionality in the OLE Server layer 246 that will transmit the instruction to the destination. The OLE Server layer will pass the information to the TCP/IP layer 247, which will in turn pass the information to the wireless interface layer 248. The wireless interface layer 248 will transmit the information via a wireless medium to the wireless interface layer 218 on the wireless scanner. A variety of types of wireless mediums exist, such as infrared and spread spectrum radio frequency. The wireless network communication stack on the wireless scanner will then pass the information through the TCP/IP layer 217 and the OLE Server layer 216 so that it reaches the I/O Program layer 215. The transmitted information will then invoke the appropriate functionality in the I/O Program layer so as to display the desired information on the display 212. Since the wireless display application program was developed specifically to display information on the wireless scanner, the visual display appearance that is generated is likely to be tailored to the display capabilities of the wireless scanner. Thus, the wireless display appearance of the information on the wireless display will typically be unique, and will not correspond to the appearance of the same information on other display devices.

In a similar manner, if it is desired to display information on a local display device such as the primary display device, a local display application program can be developed for that purpose. The local display application program can receive input information from the tethered scanner 236 on the computer system via the normal information transfer mechanisms (e.g., an I/O port and an internal bus). When a local display application program wishes to display information, it would generate the appropriate instructions for the GUI in use on the local display device. For example, local display application program 234 could communicate with local display 232 by issuing appropriate GUI display functions. It is likely that the visual display appearance would be tailored and optimized for the display capabilities of the local display device, such as by using the entire display area or by using specialized display functions such as animation or full-motion video. Thus, it is unlikely that the local display appearance of the information on the local display would be the same as that of the wireless scanner display appearance of the same information.

If it is desired to display information on another device that is physically networked to computer system 230, a network display application program would typically be developed for that purpose. The network device 270 in FIG. 2 could be any type of network device, including another computer system. To display information on a particular network device, it would be necessary for an application program on computer system 230 to know not only the appropriate instructions to transmit information over the network (i.e., the communication interface), but also the specific display capabilities of the network device. In a similar manner to the wireless display application program, the network display application program 254 could generate information to be displayed on the network device 270, select an appropriate instruction to invoke the display interface to display 272, and then perform the necessary steps to transmit the instruction to the network device 270. The information is transmitted by specifying the destination of the network device, and then invoking functionality in the OLE Server layer 256 that will transmit the instruction to the destination. The OLE Server layer will pass the information to the TCP/IP layer 257, which will in turn pass the information to the Ethernet interface layer 258. The Ethernet interface layer 258 will transmit the information via a physical medium to the Ethernet interface layer 278 on the network device. A variety of types of physical mediums exist, such as copper wire and fiber-optic cable. The network communication stack on the network device will then pass the information through the TCP/IP layer 277 and the OLE Server layer 276 so that it reaches the I/O Program layer 275. The transmitted information will then invoke the appropriate functionality in the I/O Program layer so as to display the desired information on the display 272. In the same way that the visual display appearances generated by the other application programs were tailored to the display device in use, the visual display appearance of the information on the display 272 is likely to be tailored to display 272. Thus, it is unlikely that the network display appearance of the information on the network display will be the same as that of the local display appearance or the wireless display appearance for the same information.

Figure 3:
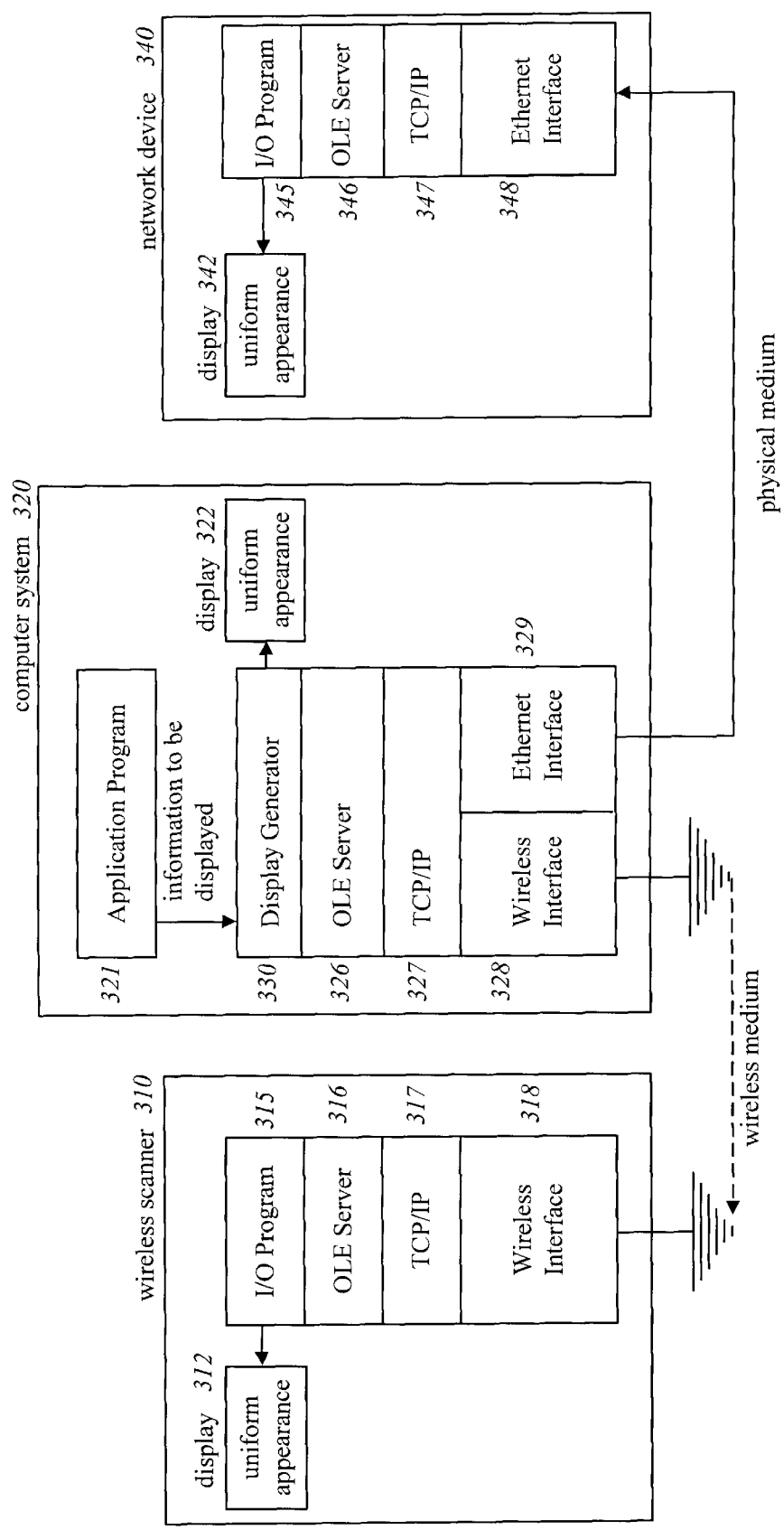
FIG. 3 is a block diagram illustrating an embodiment of the Display Generator system for displaying information on a variety of display devices.

FIG. 3 displays an implementation of the Display Generator (DG) system for displaying information to a variety of display devices. The DG system provides an interface for an application program to communicate with one of a variety of display devices, and eliminates the problems associated with multiple application programs that display the same information as well as multiple visual display appearances for the same displayed information. In order to generate a uniform visual display appearance on any of the display devices, the DG system has access to the necessary information about the display capabilities of the various possible display devices.

FIG. 3 includes a wireless scanner 310, a computer system 320, and a network device 340. The wireless scanner includes an integrated display 312, and it can communicate with the computer system via a wireless connection mechanism. The wireless connection mechanism consists of a stack with several layers, those being from lowest to highest a wireless interface layer 318, a TCP/IP layer 317, an OLE Server layer 316, and an I/O Program layer 315. Each of the layers can communicate with neighboring layers, the I/O Program layer 315 can communicate display information to the display 312, and the wireless interface layer can communicate with the computer system via wireless transmissions. The network device can similarly communicate with the computer system over a physical medium by using an Ethernet interface layer 348 of its network communication mechanism. The network device also contains a display 342, and its network communication mechanism consists of a stack with several layers. The lowest layer of the stack is the Ethernet interface layer, with the other layers in increasing order being the TCP/IP layer 347, the OLE Server layer 346, and the I/O Program layer 345. Each of the layers can communicate with neighboring layers, and the I/O Program layer can communicate display information to the display 342.

The computer system 320 includes a single application program 321, a display 322, communication mechanisms for both wireless and network communications, and the Display Generator (DG) system 330. The DG system can receive information from the application program, and can communicate information to either the display or to the OLE Server layer 326. In one embodiment, the OLE Server layer is the top stack layer of the communication mechanism on the computer system, while in an alternate embodiment the DG system is the top layer of the communication stack and the OLE Server layer is the next lower layer. The OLE Server layer communicates with the TCP/IP layer 327, which can communicate with either the wireless interface layer 328 or the Ethernet interface layer 329. Thus, the application program can display information on any of the displays 312, 322, or 342 without knowing the details of how the information is to be displayed or how the information is to be transmitted. Instead, the application program merely transmits the information to be displayed to the DG system, and the DG system invokes the appropriate functionality to communicate directly to the display 322 or through either the wireless or Ethernet interface.

The DG system receives the information to be displayed from the application program, and first determines the display device on which to display the information. The determination can be made in a variety of ways, such as an indication from the application program, a mapping that is maintained between the application program and a display, or by monitoring a source of information received by the application program to which the program is responding. The DG system then analyzes the display capabilities for the possible display devices, and selects a uniform visual display appearance for the information. After determining the uniform visual display appearance, the DG system then generates the necessary instructions to invoke the corresponding functions in the display interface to the display device, and transmits the instructions to the device. For example, to display information on the local display 322, the DG system can generate instructions for the window system used by the computer system's GUI. The instructions generated will then be executed by the CPU on the computer system, causing the information to be displayed in a window on display 322. Alternately, if the information is to be transmitted to a device other than the computer system, the DG system determines the type of display functions available through the display interface to that device, as well as the communication mechanism by which to transmit the information to that device. The DG system then transmits the instruction that it generates to the OLE Server layer, which passes the information to the TCP/IP layer. Based on the type of transmittal instruction generated by the DG system, the TCP/IP layer transmits the information via either the wireless interface or the Ethernet interface. Information traveling via the wireless interface will pass to the wireless scanner, and information traveling via the Ethernet interface will be transmitted to the network device. When the instructions are received at either the wireless scanner or the network device, they will pass through the layers of the communication mechanism on that device until they reach the I/O Program layer. The a instructions will then be executed by a CPU on the scanner or device to invoke a function in the I/O Program layer and display the information on the display of the scanner or device. In this manner, the information will be displayed with a uniform visual display appearance on any of the display devices. This enables a user who is receiving the displayed information to use any of the display devices and receive the same visual display appearance.

Those skilled in the art will appreciate that there are a variety of ways to transmit information between devices, and a variety of ways to display information on display devices. In addition, there can also be many ways to display information with a uniform visual display appearance on several different display devices. The DG system can also generate instructions that are to be executed on the local CPU of the computer system so that information to be displayed is generated and then transmitted to the receiving device to be displayed there.

Figure 4:
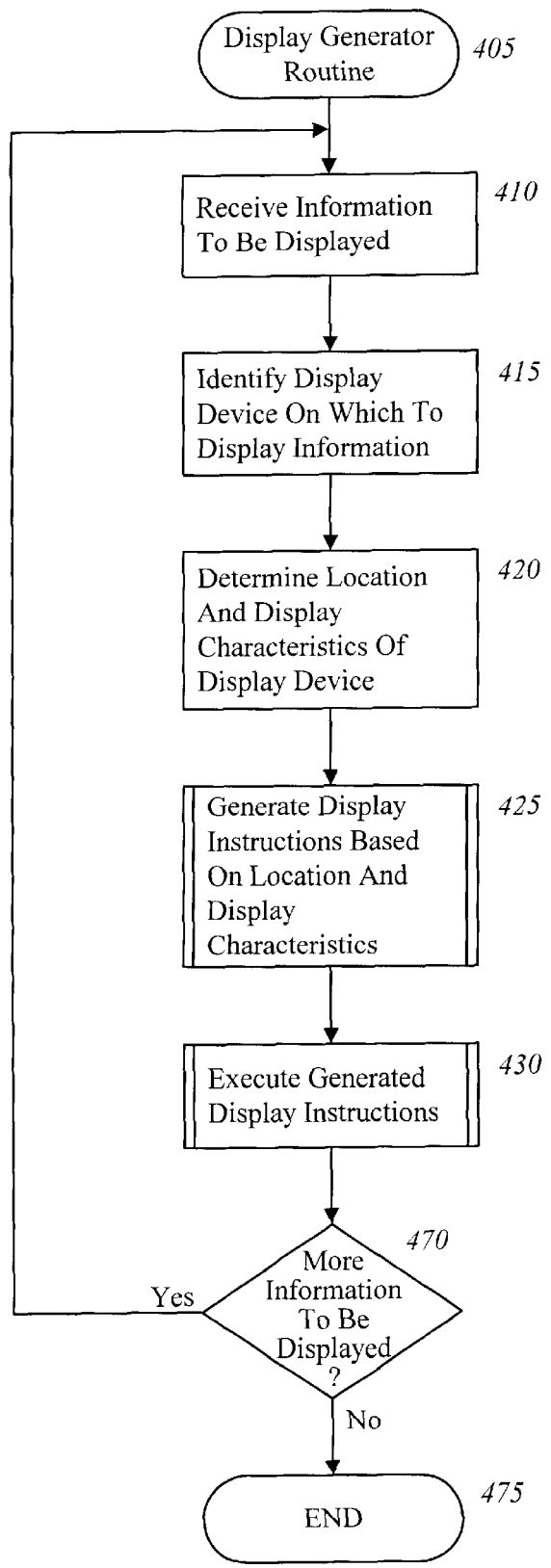
FIG. 4 is a flow diagram of a possible implementation of the Display Generator routine.

FIG. 4 is a flow diagram of an implementation of the Display Generator (DG) routine. The DG routine will receive information to be displayed, identity an appropriate display device, determine the display capabilities and location of the device, and generate the necessary instructions to display the information on that device with a uniform visual display appearance. In the illustrated embodiment, one of the possible display devices is a wireless input device with an integrated display. The integrated display has the minimum display capabilities of any of the possible display devices, having only a limited display size and a single type of non-proportional font for textual information. In addition, the wireless input device has a proprietary display interface to the integrated display through which only the size and location of textual information is specified. Examples of wireless data input device with an integrated display includes a variety of scanner devices from Symbol Technologies, such as the LRT 3800 laser radio terminal. The LRT 3800 includes an alphanumeric keyboard, a Supertwist LCD backlit display, and a 16-bit DOS architecture. The LRT 3800 uses a spread spectrum radio frequency (RF) network for on-line data exchange with a host computer. Each LRT can run software from Point Information Network that controls the display of the LRT, such as Wave Link Display Server software. The Wave Link OLE Server VB for NT software allows an OLE server to run on an WINDOWS NT-based host, and communicate with an LRT running the Wave Link display software.

The DG routine begins at step 410 where the routine receives the information to be displayed from an application program. The routine continues to step 415, where it identifies the display device on which to display the information. The display device can be identified in a variety of manners, including an indication from the information that it has received, a mapping that is maintained by the routine, information in a database, etc. The routine then continues to step 420 to determine the location and the display characteristics of the display device. The location and display characteristics of a display device can be determined in a variety of ways, such as by analyzing a network identifier for the device, analyzing the display interface to the device, accessing a database of display device locations and capabilities, etc. After determining the location and display characteristics, the routine continues to step 425 to execute a subroutine that generates display instructions to display the information on the display device with a uniform visual display appearance. The routine then executes in step 430 a subroutine that executes the generated display instruction so that the information is displayed on the display device with a uniform visual display appearance. The routine then continues to step 470 to determine if there is more information to be displayed. If so, the routine loops back to step 410 to receive more information, and if not, the routine ends at step 475.

Figure 5:
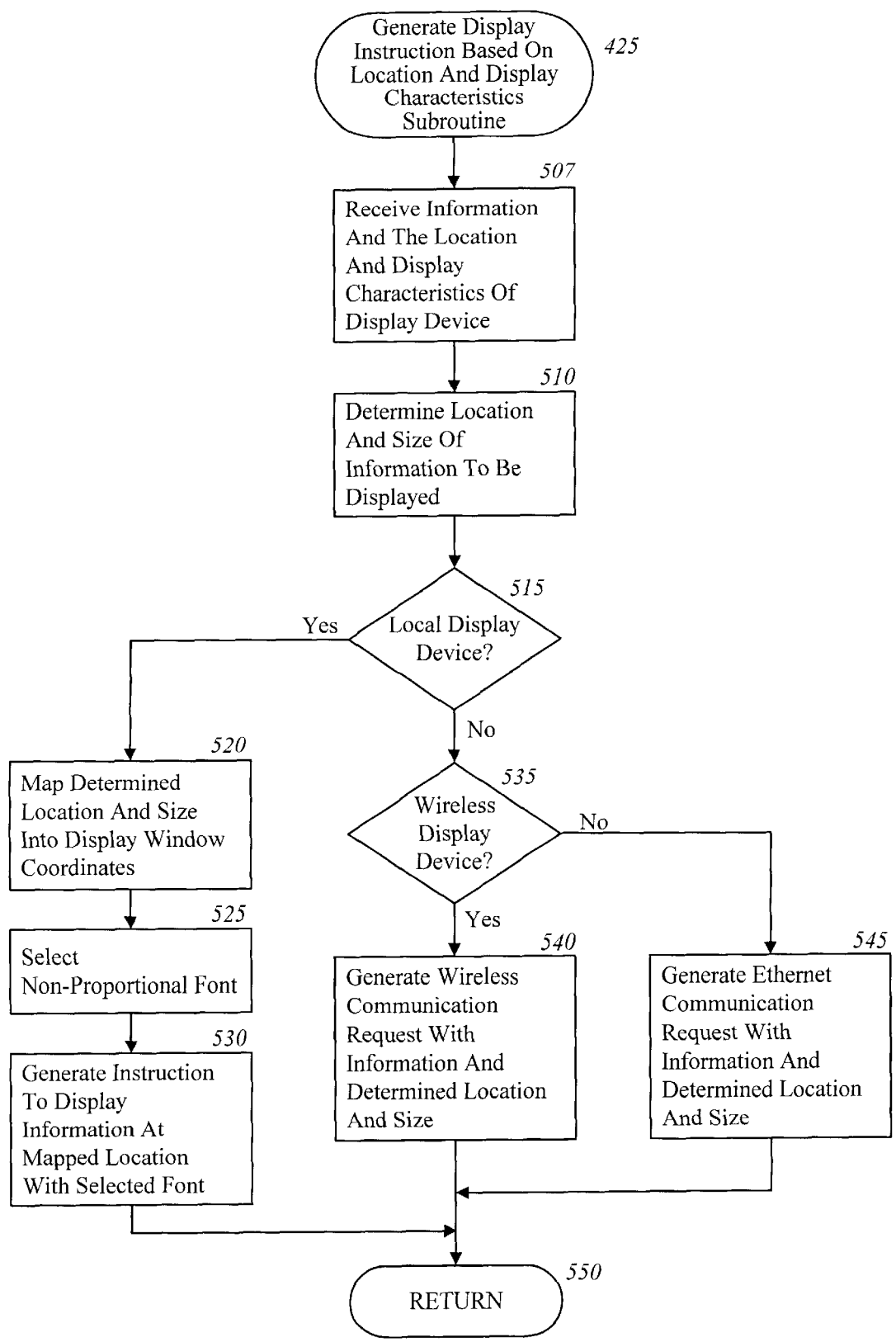
FIG. 5 is a flow diagram of a possible implementation of the Generate Display Instructions Based On Location And Display Characteristics subroutine.

FIG. 5 is a possible implementation of the Generate Display Instructions Based On Location And Display Characteristics subroutine 425. The subroutine receives the information to be displayed, as well as the display location and display characteristics of the display device. The subroutine then generates an appropriate instruction to display the information on the display device with a uniform visual display appearance. The subroutine begins in step 507, where it receives the information to be displayed as well as the location and display characteristics of the display device. The subroutine continues to step 510 where it determines a location on the display device for the information to be displayed, as well as the size of the information on the display. For example, information could be displayed just below the last information that was displayed, at the same location as the last information but with the previous information scrolled upward, or with the new information overwriting the old information. If the display device with the minimum display capabilities can only support limited sizes of information (e.g., font sizes), then the size of the information will be chosen to best match one of the minimum display capabilities. In step 515, the routine determines if the display device is local. If so, the routine continues to step 520 where it maps the determined location and size for the information into the coordinate system for the display window on the local display device. In step 525, the subroutine selects a non-proportional font to be used with which to display the information. Since the integrated display of the wireless input device has a non-proportional font, this selection will ensure a uniform visual display appearance for the textual information. In step 530, the subroutine then generates an instruction to display information at the determined location on the local display device with the selected non-proportional font of the determined size (e.g., a window instruction for the GUI on the local display device). If it was instead determined in step 515 that the display device was not local, the subroutine continues to step 535 to determine if the display device is the integrated display of the wireless input device. If so, the subroutine continues to step 540, where it generates a request to transmit the determined location, the determined size, and the display information to the wireless scanner via a wireless transmission. If the display device is a device on a network rather than a wireless input device, the subroutine instead continues to step 545 where it generates an Ethernet communication interface request, including the proper instructions to invoke display functions of the display interface to that network device to display the information. For both steps 540 and 545, the destination for the transmission is typically specified by using a unique network identifier for the destination device (e.g., a TCP/IP address). After steps 530, 540, or 545, the subroutine returns in step 550.

Figure 6:
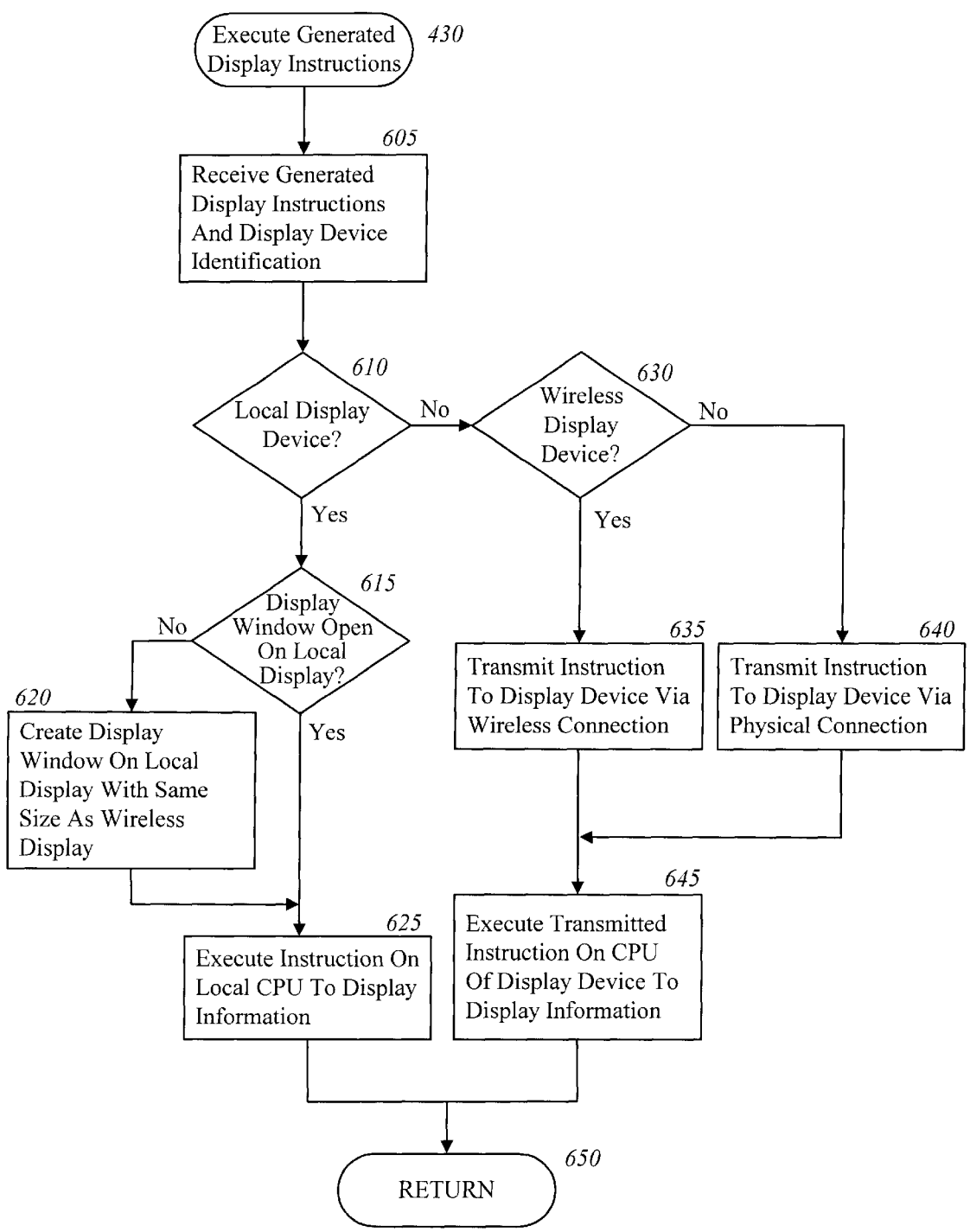
FIG. 6 is a flow diagram of a possible implementation of the Execute Generated Display Instructions subroutine.

FIG. 6 is a possible implementation of the Execute Generated Display Instructions subroutine. The subroutine receives the generated display instructions and the destination display device, and transmits and invokes the generated instructions so as to display the information on that device. In step 605, the subroutine receives the generated display instructions and an identification of the display device. In step 610, the routine determines if the display device is a local display device. If so, the routine continues to step 615 to determine if a display window for the application program is open on a local display and whether it has the proper size. The proper size can be determined from the possible display device with the minimum display size and capabilities, in this illustration being the integrated display of a wireless input device. If there is not such an open window, the subroutine creates a display window with the proper size in step 620 to emulate the integrated display. Alternately, if there is an existing window of the wrong size, the routine could resize the window rather than creating a new one. If the local display device has display capabilities that are greater than those of the minimum display device, the type of window created can be chosen so as to match the minimum device display capabilities (e.g., no scrollbars), or the subroutine can merely generate only those display instructions which match the minimum display capabilities. After step 620, or if a display window was already open in step 615, the subroutine continues to step 625 where it executes the generated instructions on the local CPU, thereby invoking functions in the display interface to the local display device and displaying the received information. If it was determined in step 610 that the display device was not local, the subroutine continues instead to step 630 to determine if the display device is a wireless device. If so, the subroutine continues to step 635 where it transmits the instructions that were generated to the display device via a wireless connection. If the display device is instead accessible via a physical network connection, the subroutine continues from step 630 to step 640 where it transmits the generated instructions to the display device via the physical connection. After step 635 or step 640, the subroutine continues to step 645 where it causes the transmitted instructions to be executed on the CPU of the display device, thereby invoking functions in the display interface to the display device and displaying the received information. After step 625 or step 645, the subroutine returns in step 650.

Those skilled in the art will appreciate that information can be transmitted to a device in a number of ways, including through the use of wireless or physical network communication protocols. In addition, the DG routine could generate instructions for a display device that is not local but have the instructions be executed on the local CPU to generate display information which is then transmitted to the non-local display device.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method in a computer system for displaying information on a bar code scanning device, the computer system having a tethered bar code scanning device with a display and having an untethered bar code scanning device with a display, the tethered bar code scanning device being physically connected to the computer system and the untethered bar code scanning device being not physically connected to the computer system, the display of the tethered bar code scanning device having different display capabilities for displaying information than the display of the untethered bar code scanning device, the method comprising:

selecting display capabilities that are common to the displays of the tethered and untethered bar code scanning devices;

receiving input information from one of the bar code scanning devices;

in response to receiving the input information, generating information to be displayed on the display of the one bar code scanning device;

generating an instruction to display the generated information on the display of the one bar code scanning device by using the selected display capabilities so that the generated information when displayed will have a uniform visual appearance regardless of whether the one bar code scanning device is the tethered bar code scanning device or the untethered bar code scanning device; and displaying the generated information with the uniform visual appearance on the one bar code scanning device by, when the one bar code scanning device is the tethered bar code scanning device, executing the generated instruction on the computer system; and when the one bar code scanning device is the untethered bar code scanning device, sending the generated instruction to the untethered bar code scanning device for execution by the untethered bar code scanning device.

2. The method of claim 1 wherein there is only one possible visual appearance for the generated information when displayed on the untethered bar code scanning device, and including the step of selecting the one possible visual appearance to be the uniform visual appearance.

3. The method of claim 1 wherein when the one bar code scanning device is the tethered bar code scanning device, the display of the untethered bar code scanning device is emulated on the display of the tethered bar code scanning device.

4. The method of claim 3 wherein a computer program is designed to display information on the display of the untethered bar code scanning device with a specified visual appearance, and wherein the emulated display is used to test whether the computer program can display the information on the display of the untethered bar code scanning device with the specified visual appearance.

5. The method of claim 1 wherein the computer system has a plurality of untethered bar code scanning devices, and wherein each of the plurality receive distinct generated instructions from the computer system such that each of the plurality displays different information.

6. In a computer system having a device of either a tethered type or an untethered type, the tethered type and the untethered type each having an associated display, the associated display for the tethered type having different display capabilities than the associated display for the untethered type, a method for displaying information with a uniform appearance comprising:

receiving information from an application program, the received information to be displayed on the associated display for the device;

determining a uniform appearance such that the received information when displayed will have the determined uniform appearance regardless of whether the device is tethered or untethered; and displaying the received information with the determined uniform appearance on the associated display for the device by, when the device is tethered, executing a first instruction on the computer system; and when the device is untethered, sending a second instruction to the device for execution by the device, the second instruction distinct from the first instruction.

7. The method of claim 6 wherein when the device is untethered, the second instruction is sent to the device via a wireless medium.

8. The method of claim 6 wherein the computer system and the device each have an identifier, and including the steps of:

determining the identifier for the device; and after determining the uniform appearance, determining the device to be untethered when the identifier for the device is different from the identifier for the computer system.

9. The method of claim 8 wherein the computer system has a plurality of untethered devices each with an identifier, wherein the computer system and the untethered devices are part of a shared network, wherein the identifiers are unique network addresses, and wherein the sending of the second instruction to the device is performed by invoking network functionality that transfers data to a specified destination, the specified destination being the identifier for the device.

10. The method of claim 6 wherein a computer program that displays information on an untethered device is tested by executing the computer program on a computer system with a tethered device and by displaying the information on a display device for the computer system.

11. A method in a computer system for displaying information, the computer system having a tethered display device, a tethered data input device and an untethered data input device, the untethered device having an attached display with different capabilities for displaying information than the tethered display device, the method comprising:

selecting display capabilities that are common to the tethered display device and the attached display;

receiving input information from one of the data input devices;

in response to receiving the input information, generating information to be displayed;

generating an instruction to use at least one of the selected display capabilities to display the generated information in such a manner that the generated information will have a uniform appearance when displayed on either the tethered display device or the attached display;

when the one data input device is the tethered data input device, executing the generated instruction on the computer system to display the generated information with the uniform appearance on the tethered display device; and when the one data input device is the untethered data input device, sending the generated instruction to the untethered data input device for execution so as to display the generated information with the uniform appearance on the attached display.

12. The method of claim 11 wherein there is only one possible appearance for the generated information when displayed on the attached display, and including the step of selecting the uniform appearance to be the one possible appearance.

13. The method of claim 11 wherein the computer system has a plurality of untethered data input devices, wherein each of the data input devices has an identifier, and including the steps of:

determining the identifier for the one data input device;

determining that the one data input device is the untethered device when the determined identifier is different than an identifier for the computer system; and determining that the one data input device is the tethered device when the determined identifier is the same as the identifier for the computer system.

14. The method of claim 11 including the steps of:

before receiving the input information, determining the uniform appearance based on the selected display capabilities; and after determining the uniform appearance, determining whether the one data input device is the tethered data input device or the untethered data input device.

15. The method of claim 11 wherein a computer program that displays information on untethered data input devices is tested by executing the computer program on the computer system and displaying the information on the tethered display device.

16. In a computer system having a tethered data input device and an untethered data input device, a method for displaying information uniformly on either device comprising the steps of:

receiving information to be displayed;

determining a uniform appearance such that the received information when displayed on a data input device will have the determined uniform appearance regardless of whether the data input device is the tethered device or the untethered device;

receiving an indication of the data input device on which to display the received information;

after determining the uniform appearance, determining whether the indicated data input device is the tethered device or the untethered device;

generating an instruction to display the received information on the indicated data input device; and displaying the received information with the determined uniform appearance by, when the indicated data input device is the tethered device, executing the generated instruction on the computer system to display the received information on a display for the tethered device; and when the indicated data input device is the untethered device, executing the generated instruction to send the received information to the untethered device for display by the untethered device.

17. The method of claim 16 wherein the untethered device is a portable device with an integrated display, and wherein the generated instruction is sent to the untethered device via a wireless medium.

18. The method of claim 16 wherein the computer system has an identifier and a plurality of untethered data input devices, wherein each of the plurality has a unique identifier, wherein the received indication is the identifier for the data input device, and wherein when the indicated data input device is untethered, sending the received information to the indicated data input device by sending the received indication and the generated instruction to an intermediate transmitting device, the transmitting device for sending information to the plurality of untethered data input devices.

19. The method of claim 16 wherein a computer program that displays information on an untethered data input device is tested by executing the computer program on a computer system with a tethered data input device and by displaying the information on a display device for the computer system.

20. In a computer system having a first data input device and a second data input device, each of the data input devices having an associated display with display characteristics that affect appearance of displayed information, the associated display for the first device having different display characteristics than the associated display for the second device, a method for displaying information with a uniform appearance on either associated display comprising the steps of:

selecting display characteristics that are shared by the associated displays for the first and second devices;

receiving information to be displayed;

receiving an indication of a data input device;

generating an instruction based on whether the indicated data input device is the first device or the second device, the generated instruction to display the received information on the associated display of the indicated data input device by using at least one of the selected display characteristics in such a manner that the received information will be displayed with a uniform appearance regardless of whether the indicated data input device is the first device or the second device; and executing the generated instruction so as to display the received information with the uniform appearance on the associated display for the indicated data input device.

21. The method of claim 20 wherein the first device is a portable device with an integrated display, wherein the associated display for the first device is the integrated display, and wherein the associated display for the second device is a display device tethered to the computer system.

22. The method of claim 21 wherein the integrated display is emulated on the display device.

23. The method of claim 20 wherein the instruction generated when information is to be displayed on the associated display for the first device is different than the instruction generated when that same information is to be displayed on the associated display for the second device.

24. The method of claim 20 wherein the display characteristics of the associated display for one of the data input devices is a subset of the display characteristics of the associated display for the other data input device, and wherein the selecting of the shared display characteristics involves choosing the display characteristics of the associated display for the one data input device.

25. The method of claim 20 wherein the information to be displayed is text, wherein each associated display has a display size, and wherein determining the appearance includes:

determining a smaller of the display sizes for the associated displays;

selecting the determined smaller display size as a maximum display size in which the text can be displayed;

determining a text font type and a text font size which can be displayed by both associated displays, the determined font type and determined font size such that displaying the text using the determined font type and determined font size requires an amount of space on an associated display that is less than the selected maximum size;

determining a text font color which can be displayed by both associated displays; and designating the appearance of the displayed text to include the determined font type, the determined font size, and the determined font color.

26. A computer system for displaying information with a uniform appearance, comprising:

a display device;

a data input device with a display, the data input device either of a tethered type or of an untethered type; and a display generator that determines a uniform appearance for information to be displayed to either the display device or the display of the data input device, that determines whether the data input device is tethered or untethered, that when the data input device is tethered, executes a first instruction to display the information on the display device with the uniform appearance, and that when the data input device is untethered, sends a second instruction distinct from the first instruction to the data input device to display the information on the display of the data input device with the uniform appearance, whereby information displayed on the display device appears substantially similar to information displayed on the display of the untethered data input device.

27. The computer system of claim 26 wherein the data input device includes the means for receiving the second instruction via a wireless medium and the means for executing the second instruction, and wherein the computer system includes a processing unit that executes the first instruction.

28. The computer system of claim 26 wherein the computer system additionally comprises a plurality of untethered data input devices that are each part of a network, wherein the computer system and each of the plurality has a unique network identifier, wherein a data input device is determined to be untethered when the network identifier for the data input device is different from the network identifier for the computer system, and wherein the sending to the data input device involves invoking network data transfer functionality with a destination of the network address for the data input device.

29. The computer system of claim 26 including a computer program that displays information on an untethered data input device, and wherein the computer program is tested by displaying the information on the display device.

30. A computer system for displaying information with a uniform appearance on one of multiple data input devices, comprising:

a first data input device with a first associated display, the first associated display having a first set of display characteristics that affect appearance of displayed information, and a second data input device with a second associated display, the second associated display. having a second set of display characteristics that affect appearance of displayed information, the second set different from the first set;

a display generator for selecting display characteristics that are shared by the first and second sets, for receiving information to be displayed, for determining an appearance such that the received information when displayed on an associated display will have the determined appearance regardless of whether the associated display is the first associated display or the second associated display, for determining an associated display on which the received information will be displayed, and for displaying on the determined associated display the received information with the determined appearance by executing an instruction using display characteristics in the selected set of display characteristics; and a processor for executing instructions.

31. The computer system of claim 30 wherein the display characteristics of the first associated display are a subset of the display characteristics of the second associated display, and wherein the selecting of the set of display characteristics involves choosing the display characteristics of the first associated display.

32. The computer system of claim 30 wherein the computer system has a plurality of portable data input devices each with an integrated display, and wherein distinct information is sent to each of the plurality of portable data input devices via a wireless medium and is displayed with the determined appearance on the integrated display of the portable data input device to which the information was transmitted.

33. A computer-readable medium containing instructions for controlling a computer system to display information with a uniform appearance, the computer system having a device of either a tethered type or an untethered type, the tethered type and the untethered type each having an associated display, the associated display for the tethered type having different display capabilities than the associated display for the untethered type, by:

receiving information from an application program, the received information to be displayed on the associated display for the device;

determining a uniform appearance such that the received information when displayed will have the determined uniform appearance regardless of whether the device is tethered or untethered; and displaying the received information with the determined uniform appearance on the associated display for the device by, when the device is tethered, executing a first instruction on the computer system; and when the device is untethered, sending a second instruction to the device for execution by the device, the second instruction distinct from the first instruction.

34. The computer-readable medium of claim 33 wherein the computer system has an identifier and a plurality of untethered devices, wherein each untethered device has a identifier distinct from the identifier for the computer system, and wherein the computer system is further controlled to perform the steps of:

determining an identifier for the device; and after determining the uniform appearance, determining the device to be untethered when the identifier for the device is different from the identifier for the computer system.

35. The computer-readable medium of claim 33 wherein a computer program that displays information on an untethered device is tested by executing the computer program on a computer system with a tethered device and by displaying the information on a display device for the computer system.

36. A computer-readable medium containing instructions for controlling a computer system having a display device, a tethered data input device and an untethered data input device, the untethered device having an attached display with different capabilities for displaying information than the display device, the controlling to display information by:

selecting display capabilities that are common to the display device and the attached display;

receiving input information from one of the data input devices;

in response to receiving the input information, generating information to be displayed;

generating an instruction to use at least one of the selected display capabilities to display the generated information in such a manner that the generated information will have a uniform appearance when displayed on either the display device or the attached display;

when the one data input device is the tethered data input device, executing the generated instruction on the computer system to display the generated information with the uniform appearance on the display device; and when the one data input device is the untethered data input device, sending the generated instruction to the untethered data input device for execution so as to display the generated information with the uniform appearance on the attached display.

37. The computer-readable medium of claim 36 wherein the untethered device is a portable device with the attached display integrated with the untethered device, wherein the display capabilities of the integrated display are a subset of the display capabilities of the display device, and wherein the selecting of the display capabilities involves choosing the display capabilities of the integrated display.

38. The computer-readable medium of claim 37 wherein the integrated display is emulated on the display device.

39. The computer-readable medium of claim 37 wherein the instruction generated when information is to be displayed on the display device is different than the instruction generated when that same information is to be displayed on the integrated display.

* * * * *